United States Patent [19]

Walker, Jr.

[11] 4,191,861
[45] Mar. 4, 1980

[54] TELEPHONE AMPLIFIER

[75] Inventor: Wesley F. Walker, Jr., Ringgold, Ga.

[73] Assignee: Walker Equipment & Service Co., Ringgold, Ga.

[21] Appl. No.: 803,509

[22] Filed: Jun. 6, 1977

Related U.S. Application Data

[63] Continuation-in-part of Ser. No. 761,932, Jan. 24, 1977, Pat. No. 4,151,376.

[51] Int. Cl.$^2$ .............................................. H04M 1/60
[52] U.S. Cl. .................................. 179/81 B; 179/1 A
[58] Field of Search ................ 179/1 A, 81 B, 100 R, 179/100 L, 178, 1 PC

[56] References Cited

U.S. PATENT DOCUMENTS

| | | | |
|---|---|---|---|
| 2,885,484 | 5/1959 | Faulkner et al. | 179/81 B |
| 3,254,160 | 5/1966 | Day | 179/81 B |
| 3,444,329 | 5/1969 | Krumreich | 179/100 R |
| 3,997,734 | 12/1976 | Champan | 179/81 R |

OTHER PUBLICATIONS

Advertisement by Tone Commander Systems, Inc., "TA-20 Telephone Receiver Amplifier".
Advertisement by Tone Commander Systems, Inc., "Receiver Amplifier".

*Primary Examiner*—Bernard Konick
*Assistant Examiner*—Joseph A. Popek
*Attorney, Agent, or Firm*—Seidel, Gonda, Goldhammer & Panitch

[57] ABSTRACT

A telephone amplifier for connection to a telephone set and a telephone handset associated therewith, the telephone set having a modular plug receptacle connected to a pair of receiver input signal lines and to a pair of transmitter input supply lines, the handset having a modular plug and cord connected thereto. The telephone amplifier includes a housing mountable on the telephone set. The housing has a modular plug receptacle for receiving the modular plug associated with the telephone handset. The amplifier includes an amplifier modular plug and a cord connected thereto. The amplifier modular plug is adapted for insertion into the modular plug receptacle in the telephone set. The amplifier further includes an amplifier operatively connected to the housing modular plug receptacle and to the amplifier modular plug and cord for amplifying a signal received on the pair of telephone set receiver input signal lines. The amplifier is connected to the telephone set and handset without alteration of the receiver and transmitter input lines and the handset cord.

5 Claims, 6 Drawing Figures

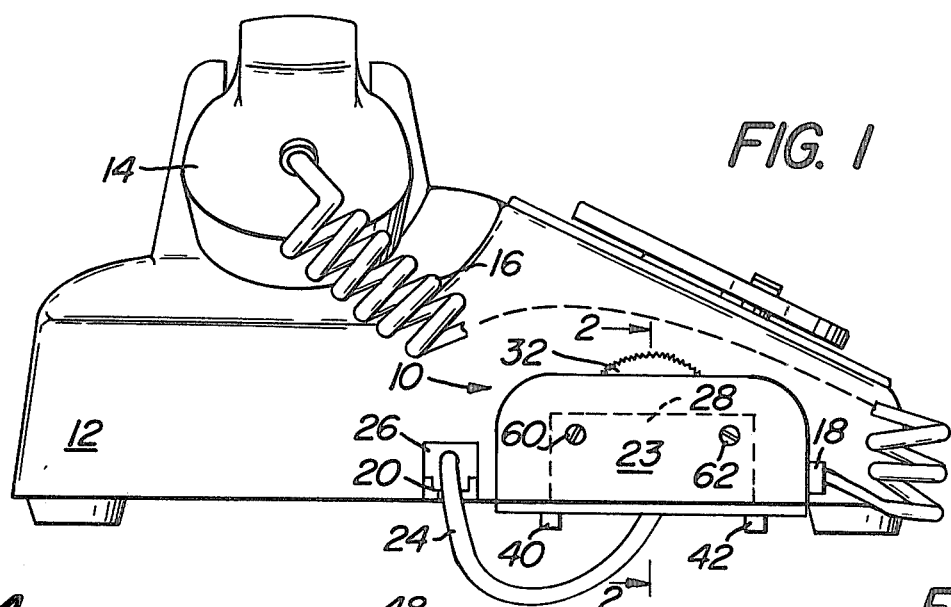
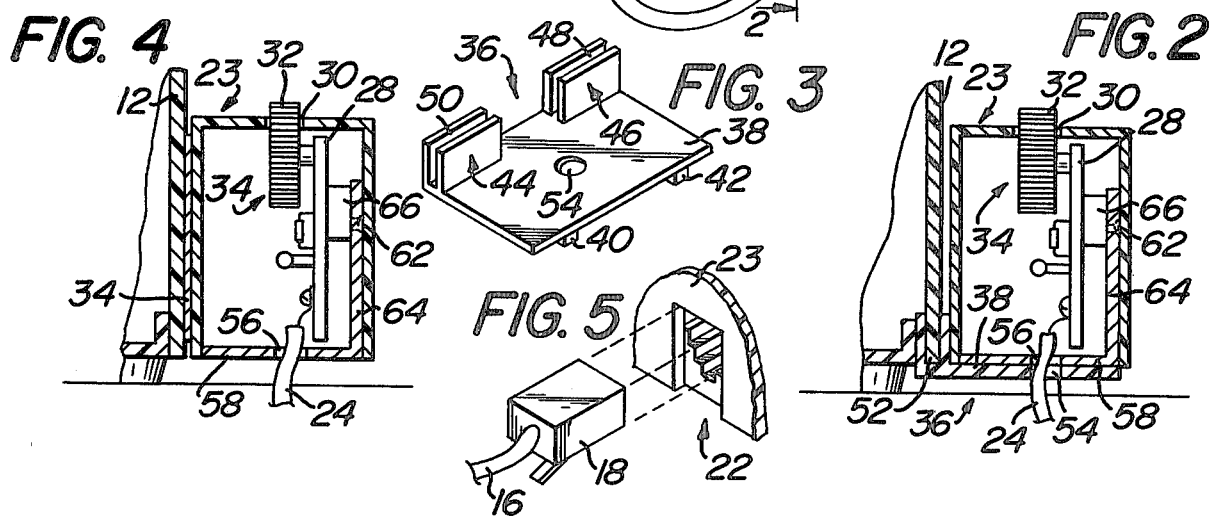
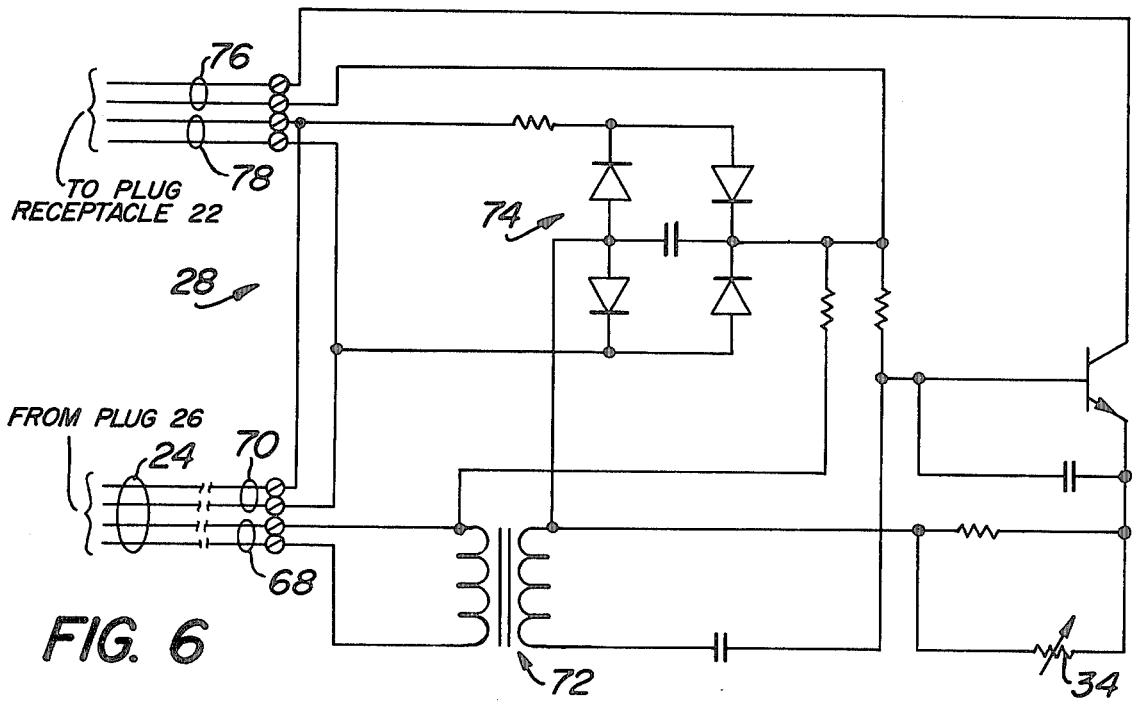

TELEPHONE AMPLIFIER

This is a continuation-in-part application of patent application Ser. No. 761,932 for "Amplifier for Telephone Handset" filed Jan. 24, 1977 now U.S. Pat. No. 4,151,376.

BACKGROUND OF THE INVENTION

The present invention is directed to an amplifier for connection to a telephone set and to a telephone handset associated therewith. In particular, the invention is directed to an amplifier which is directly connectable to a modular plug receptacle in the telephone set and to a modular plug associated with the telephone handset cord. The amplifier is mountable on the telephone set.

Amplifiers which are mountable on a telephone set are well-known. Such amplifiers include the TA-20 receiver amplifier manufactured by Tone Commander Systems, Inc. of Redmond, Wash. and the S-11 amplifier manufactured by Melco of Bellevue, Wash.

Heretofore, telephone amplifiers mountable on the telephone set were not compatible with the modular plug assemblies utilized in state of the art telephones. In addition, the installation of such amplifiers required the alteration of standard telephone line cord and/or the color coding of the receiver input signal lines. Installation of the telephone amplifier was relatively slow and cumbersome. The receiver input signal lines had to be properly color coded, and installation proceeded step by step accordingly to relatively complicated wiring schematics. Special care had to be taken to avoid reversing the polarity of the input signal lines.

An advantage of the present invention is that it is directly connectable to state of the art telephones having modular plug assemblies.

A further advantage of the invention is that it can be quickly and conveniently installed without color coding the receiver input signal lines and without reference to any wiring schematics.

A still further advantage of the invention is that it is operable without regard to the polarity of the input lines.

Further advantages of the invention appear hereinafter.

BRIEF SUMMARY OF THE INVENTION

A telephone amplifier for connection to a telephone set and a telephone handset associated therewith, the telephone set having a modular plug receptacle connected to a pair of receiver input signal lines and to a pair of transmitter input supply lines, the handset having a modular plug and cord connected thereto. A housing mountable on the telephone set is provided with a modular plug receptable for receiving the modular plug associated with the telephone handset. An amplifier modular plug and a cord connected thereto are directly connectable to the modular plug receptacle in the telephone set. Amplifier means operatively connected to the housing modular plug receptacle and to the amplifier modular plug and cord amplify the signal received on the telephone set receiver input signal lines.

For the purpose of illustrating the invention, there are shown in the drawings forms which are presently preferred; it being understood, however, that this invention is not limited to the precise arrangements and instrumentalities shown.

BRIEF DESCRIPTION OF THE DRAWINGS

FIG. 1 is a side view of the amplifier of the present invention mounted on a telephone having a modular plug assembly.

FIG. 2 is a cross-sectional view of the amplifier mounted by means of a bracket on the telephone set.

FIG. 3 is a perspective view of the bracket.

FIG. 4 is a cross-sectional view of the amplifier mounted by means of double-back adhesive on the telephone set.

FIG. 5 is a perspective view of a modular plug assembly.

FIG. 6 is an electrical schematic of the amplifier circuitry.

DETAILED DESCRIPTION OF THE INVENTION

Referring to the drawings, wherein like numerals indicate like elements, there is shown in FIG. 1 an amplifier 10 constructed in accordance with the principles of the present invention mounted on a telephone set 12 associated with a telephone handset 14. In state of the art telephones, the handset 14 is provided with a cord 16 having at one end thereof a modular plug 18. The telephone set 12 is provided with a modular plug receptacle 20. The modular plug 18 is adapted for insertion into the plug receptacle 20. The modular plug assembly permits the handset 14 to be conveniently removed from the telephone set 12 so that repair or replacement of the telephone set or the handset becomes greatly simplified.

Heretofore, amplifiers which were mountable on a telephone set were not compatible with the modular plug assembly used in state of the art telephones. Moreover, installation of such amplifiers require special attention to color coding of the receiver input signal lines in the handset cord and required reference to relatively complicated wiring schematics. Accordingly, the installation of such amplifiers could not be effected by unskilled workmen in a rapid and efficient manner. In short, the amplifiers were not directly connectable to the telephone set and handset.

In the present invention, amplifier 10 is directly connectable to the telephone set 12 and handset 14 using a modular plug assembly. The handset cord 16 is not altered in any way. None of the handset cord wires need be color coded for installation of the amplifier. No wiring schematics or similar material is required to install the amplifier.

The amplifier 10 is provided with a modular plug receptacle 22 in a housing 24. See FIGS. 1 and 5. The modular plug receptacle 22 is adapted to receive the modular plug 18 connected to the handset cord 16. The amplifier 10 is provided with an input cord 24 having at one end thereof a modular plug 26. Modular plug 26 is adapted for insertion into the modular plug receptacle 20 in telephone set 12. See FIG. 1. The modular plug receptacle 20 is connected to a pair of receiver input signal lines and to a pair of transmitter input supply lines, all internal to the telephone set 12. The output of the amplifier 10 is transmitted via plug 18 and cord 16 to the handset 14.

The electronic components of the amplifier 10 are mounted on a printed circuit board 28 which is secured to the housing 24 as will be described more fully below. The housing 24 is provided with a slot 30 on its top surface. See FIGS. 2 and 4. The rotary dial 32 of an adjustable resistance or potentiometer 34 on printed circuit board 28 protrudes through the slot 30 for access by the operator in adjusting the gain of the amplifier.

The housing 23 is removably mounted on the telephone set 12. Preferably, the housing is removably mounted on the telephone set by means of a double-back adhesive 34 secured to the housing. See FIG. 4. The housing, with the double-back adhesive 34, is placed flush against the telephone set 12 and is pressed against the telephone set at any desired location. The modular plug 26 is then inserted into the modular plug receptacle 20 in the telephone set, and the modular plug 18 attached to the handset cord 16 is then inserted into the modular plug receptacle 22 in housing 23. See FIGS. 1 and 5. No further electrical connection of the amplifier components is required.

Alternatively, the amplifier 10 may be mounted on the telephone set 12 by means of a bracket assembly 36. See FIG. 2. The bracket assembly 36 includes a support plate 38 provided with a pair of legs 40 and 42. Identical pairs of spaced vertical walls 44 and 46 define two slots 48 and 50 which receive a portion 52 of the telephone set shell. See FIG. 3. The legs 40 and 42 provide support for the amplifier 10 in position on the support plate 48. There are no mechanical couplings required to fasten the bracket assembly 36 to the telephone set 12.

The support plate 38 is provided with a circular aperture 54 through which the input cord 24 passes. The input cord 24 also passes through an aperture 56 in the bottom wall 58 of the housing 23. Accordingly, the amplifier 10 is prevented from sliding on the support plate 38. The bracket assembly 36, with the amplifier 10 mounted thereon, can be conveniently re-positioned with respect to the telephone set by merely pushing the bracket assembly along the portion 52 of the telephone set shell.

The electronic components of the amplifier 10 are all mounted on the printed circuit board 28. The printed circuit board is screw-mounted by means of screws 60 and 62 to right side wall 64 which is connected to bottom wall 58. The printed circuit board is spaced apart from side wall 64 by means of a spacer 66. Thus, the printed circuit board 28 is secured in position within the housing 23 such that rotary dial 32 protrudes through slot 30 in the top surface of the housing.

The electronic components of the amplifier circuit are connected on the printed circuit board as shown in FIG. 6. The input cord 24 comprises four lines consisting of a pair of receiver input signal lines 68 and a pair of transmitter input supply lines 70. The input lines 68 are connected via plug 26 and receptacle 20 to the receiver input signal lines internal to the telephone set 12. The input lines 70 are connected via plug 26 and receptacle 20 to the transmitter input supply lines internal to the telephone set. The receiver input signal lines 68 are connected to a transformer 72 on the printed circuit board. The transmitter input supply lines 70 are connected to a full wave rectifier bridge 74 on the printed circuit board. The output of the amplifier circuit is transmitted via lines 76 to the plug receptacle 22. The plug receptacle 22 is also connected via lines 78 to the input of the full wave rectifier bridge 74. The printed circuit board ampifier circuit is identical to the circuit disclosed in co-pending application Ser. No. 761,932 in the name of the inventor herein. The disclosure of the operation of the amplifier circuit in co-pending patent application Ser. No. 761,932 is incorporated herein by reference. The full wave rectifier bridge 74 provides dc bias to the circuit independently of the polarity of the transmitter input signal lines 70. In addition, the transformer 72 renders the amplifier circuit insensitive to the polarity of the receiver input signal lines 68. The input lines 68 and 70 are pre-connected to the modular plug 26. Accordingly, to install the amplifier, plug 26 is directly inserted into telephone set receptacle 20. No further connection of the input lines 68 and 70 is required. Similarly, lines 76 and 78 are pre-connected to modular plug receptacle 22 so that no further interconnection of these lines is required. The modular plug 18 connected to handset cord 16 is merely inserted in the plug receptacle 22 to complete the connection of the amplifier 10 to the telephone set 12 and handset 14.

An advantage of the invention is that it is compatible with state of the art modular plug assemblies used in modern telephones. The invention provides amplified receiver input signals independently of both the transmitter input supply line polarity and the receiver input signal line polarity. The amplifier circuit is conveniently mounted on a printed circuit board. None of the elements of the telephone set 12 and handset 14 are altered in shape or position to connect the amplifier 10 in circuit. Installation of the amplifier 10 requires only the insertion of the handset plug 18 into receptacle 22 and insertion of the amplifier plug 26 into plug receptacle 20.

The present invention may be embodied in other specific forms without departing from the spirit or essential attributes thereof and, accordingly, reference should be made to the appended claims rather than to the foregoing specification as indicating the scope of the invention.

I claim:

1. A telephone amplifier for connection to a telephone set and a telephone handset associated therewith, the telephone set having a modular plug receptacle and the handset having a cord and a modular plug connected thereto, comprising;

a housing having a modular plug receptacle for receiving said modular plug associated with said telephone handset cord;

means for mounting said housing on a wall of said telephone set;

an amplifier modular plug and a cord connected thereto, said amplifier modular plug being adapted for insertion into said modular plug receptacle in the telephone set;

a transformer disposed within said housing and connected to said amplifier modular plug and cord; and amplifier means, disposed within said housing, having an output and an input, said output being connected to said housing modular plug receptacle and said input being connected to said transformer.

2. The telephone amplifier according to claim 1 wherein said means for mounting said housing comprises double-back adhesive means for removably mounting said housing on said telephone set.

3. The telephone amplifier according to claim 1 wherein said means for mounting said housing comprises a bracket assembly having at least a pair of spaced vertical walls defining a slot within which a portion of said telephone set is snugly seated, a support plate connected to said pair of spaced vertical walls for supporting said housing, and a pair of legs connected to said support plate for supporting the same.

4. The telephone amplifier according to claim 1 including rectifier means connected to said amplifier modular plug and cord for supplying a dc bias signal to said amplifier means 5. The telephone amplifier according to claim 1 wherein said housing is provided with a slot, and said amplifier means includes an adjustable potentiometer having a rotary dial, said rotary dial protruding through said slot.

* * * * *